(12) United States Patent
Raghunathan et al.

(10) Patent No.: US 10,966,207 B1
(45) Date of Patent: Mar. 30, 2021

(54) WIRELESS SIGNAL TRANSMISSION POWER CONTROL BASED ON USER EQUIPMENT (UE) LOCATIONS AND QUADRATURE AMPLITUDE MODULATION (QAM) CONSTELLATION SIZES

(71) Applicant: Sprint Communications Company L.P., Overland Park, KS (US)

(72) Inventors: Sathyanarayanan Raghunathan, Herndon, VA (US); Muthukumaraswamy Sekar, Brambleton, VA (US); Maheswaran Vijayakumar, Herndon, VA (US); Suresh Majjara, Herndon, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 56 days.

(21) Appl. No.: 16/289,983

(22) Filed: Mar. 1, 2019

(51) Int. Cl.
*H04W 88/02* (2009.01)
*H04L 27/06* (2006.01)
*H04W 72/04* (2009.01)
*H04W 52/30* (2009.01)

(52) U.S. Cl.
CPC ......... *H04W 72/0473* (2013.01); *H04L 27/06* (2013.01); *H04W 52/30* (2013.01); *H04W 88/02* (2013.01)

(58) Field of Classification Search
CPC .............................. H04W 88/02; H04L 27/06
USPC ....................................................... 370/329
See application file for complete search history.

(56) References Cited

U.S. PATENT DOCUMENTS

| | | | |
|---|---|---|---|
| 4,993,021 A | 2/1991 | Nannicini et al. | |
| 6,711,416 B1 | 3/2004 | Zhang | |
| 6,724,829 B1 | 4/2004 | Tzukerman et al. | |
| 6,735,420 B2 | 5/2004 | Baldwin | |
| 8,249,531 B2 | 8/2012 | Xu et al. | |
| 8,537,705 B2 | 9/2013 | Afkhamie et al. | |
| 8,537,862 B2 | 9/2013 | Blankenship et al. | |
| 8,731,600 B2 | 5/2014 | Chang et al. | |
| 8,948,807 B2* | 2/2015 | Chang ............... | H04W 72/0473 455/522 |
| 10,631,358 B1* | 4/2020 | Fang .................... | H04B 7/0473 |
| 2003/0053532 A1* | 3/2003 | Cutler ...................... | H04L 1/24 375/224 |
| 2013/0235919 A1* | 9/2013 | Plevel ..................... | H04L 27/34 375/226 |

(Continued)

*Primary Examiner* — Angel T Brockman

(57) ABSTRACT

Radio circuitry controls wireless transmit power to User Equipment (UEs). The radio circuitry receives wireless signals generated using different Quadrature Amplitude Modulation (QAM) constellation sizes. The circuitry converts the wireless signals into data symbols and converts the data symbols into uplink data. The radio circuitry determines when average symbol error is excessive for a set of QAM constellation sizes. The radio circuitry determines when the UEs are concentrated in an inner coverage range. When both the average symbol error is excessive and the UEs are concentrated in the inner range, the radio circuitry reduces transmit power and transmits wireless signals to the UEs at the reduced transmit power. When the average symbol error is no longer excessive or when the UEs are no longer concentrated in the inner range, the radio circuitry increases transmit power and transmits wireless signals to the UEs at the increased power level.

20 Claims, 6 Drawing Sheets

(56) References Cited

U.S. PATENT DOCUMENTS

2015/0092879 A1* 4/2015 Mansour ............... H04L 1/0041
375/286

* cited by examiner

WIRELESS SIGNAL TRANSMISSION POWER CONTROL BASED ON USER EQUIPMENT (UE) LOCATIONS AND QUADRATURE AMPLITUDE MODULATION (QAM) CONSTELLATION SIZES

TECHNICAL BACKGROUND

Wireless user devices exchange wireless signals with wireless communication networks for data services like voice-calling, internet-access, and media streaming. The wireless communication networks have wireless access points that exchange the wireless signals with the wireless user devices. The typical wireless access point has several antennas, modulators, and processors. The processors execute network applications like Physical Layer (PHY), Media Access Control (MAC), Radio Link Control (RLC), Packet Data Convergence Protocol (PDCP), Radio Resource Control (RRC), and Service Data Application Protocol (SDAP). The network applications control the transmission and reception of the wireless signals, and in particular, the network applications control the transmit power of the wireless signals.

The wireless communication devices are generally located throughout the radio coverage area of the wireless base station. The wireless communication devices measure and report their received signal strength and quality to the wireless access point. Since signal strength and quality vary with distance, the wireless access point determines distances to the wireless communication devices based on their reported signal strengths and qualities.

The wireless access point and wireless user devices use Quadrature Amplitude Modulation (QAM) to convert time-domain data into frequency-domain symbols for subsequent wireless transmission. The wireless access point and wireless user devices also use QAM to convert the frequency-domain symbols back into the time-domain data after the wireless transmission. QAM uses complex vectors to represent the data and larger complex vectors can carry more data. The complex vector size is referred to as the QAM constellation size. Typical QAM constellation sizes include QAM16, QAM64, QAM256, and QAM1024.

The wireless access point may lower wireless transmit power to mitigate noise and facilitate the use of larger QAM constellation sizes. The wireless communication devices that are far away from the wireless access point then suffer from weak signal reception due to the reduced transmit power. Unfortunately, the wireless access point does not efficiently and effectively use UE location and QAM constellation size to control wireless transmit power.

TECHNICAL OVERVIEW

Radio circuitry controls wireless transmit power to User Equipment (UEs). The radio circuitry receives wireless signals generated using different Quadrature Amplitude Modulation (QAM) constellation sizes. The circuitry converts the wireless signals into data symbols and converts the data symbols into uplink data. The radio circuitry determines when average symbol error is excessive for a set of QAM constellation sizes. The radio circuitry determines when the UEs are concentrated in an inner coverage range. When both the average symbol error is excessive and the UEs are concentrated in the inner range, the radio circuitry reduces transmit power and transmits wireless signals to the UEs at the reduced transmit power. When the average symbol error is no longer excessive or when the UEs are no longer concentrated in the inner range, the radio circuitry increases transmit power and transmits wireless signals to the UEs at the increased power level.

DETAILED DESCRIPTION

Figure 1:
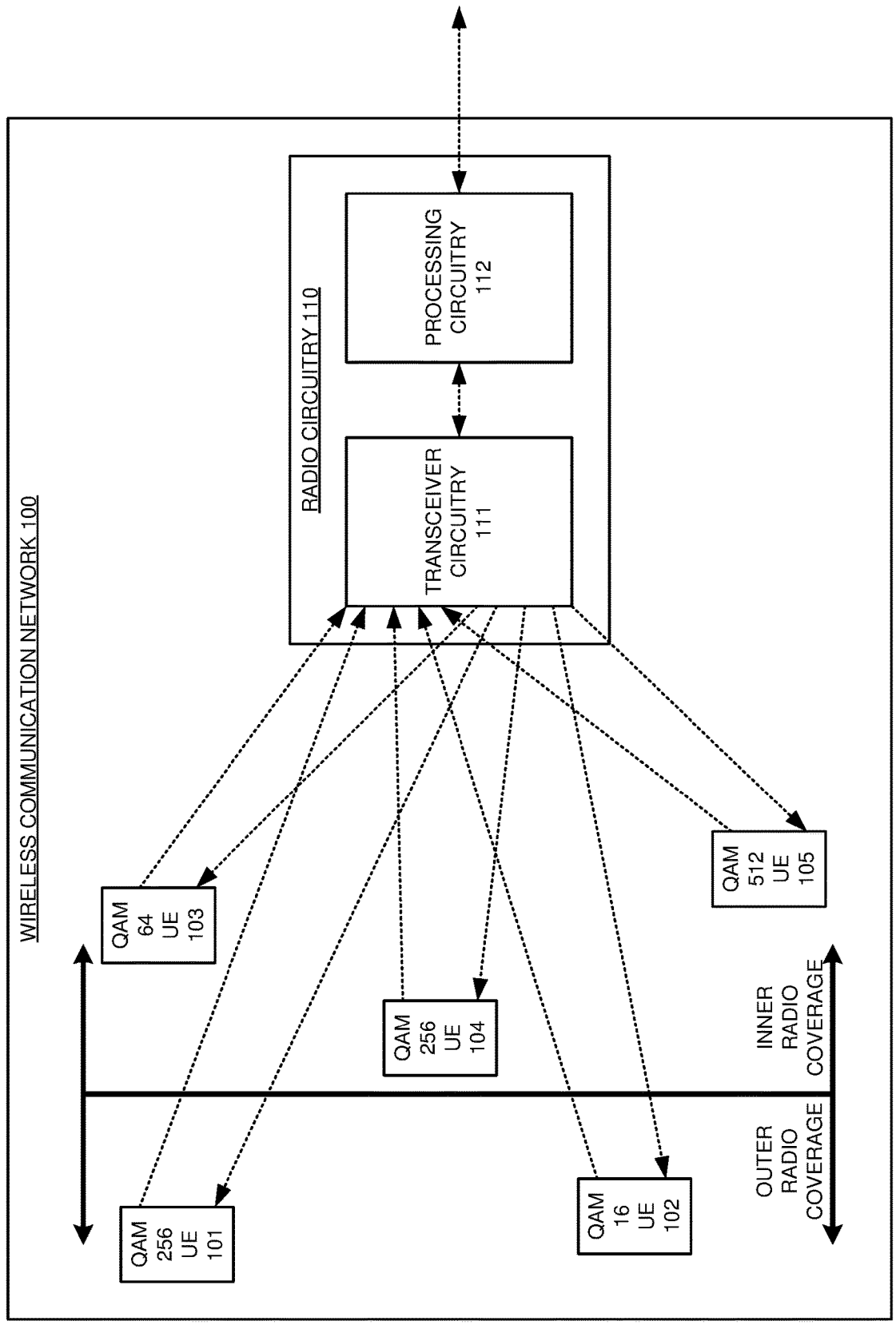
FIG. 1 illustrates a wireless communication network that controls transmit power to wireless User Equipment (UEs) based on UE Quadrature Amplitude Modulation (QAM) constellation sizes and UE locations.

FIG. 1 illustrates wireless communication network 100 that controls transmit power to wireless User Equipment (UEs) 101-105 based on Quadrature Amplitude Modulation (QAM) constellation sizes and locations of UEs 101-105. Wireless communication network 100 comprises UEs 101-105 and radio circuitry 110. UEs 101-105 use respective QAM constellation sizes 256, 16, 64, 256, and 512. UEs 101-102 are located in an outer radio coverage area that is typically further away from radio circuitry 110, and UEs 103-105 are located in an inner radio coverage area that is typically closer to radio circuitry 110. The number of UEs depicted on FIG. 1 has been restricted for clarity, and radio circuitry 110 usually serves many more UEs like UEs 101-105. For example, the inner coverage area may contain 150 UEs and the outer coverage area may contain 50 UEs. The configuration and operation of UEs 101-105 applies to these other UEs that are omitted for clarity.

Radio circuitry 110 comprises transceiver circuitry 111 and processing circuitry 112. Transceiver circuitry 111 receives wireless signals from UEs 101-105 and transmits wireless signals to UEs 101-105. The wireless signals use Fifth Generation New Radio (SGNR), Long Term Evolution (LTE), Institute of Electrical and Electronic Engineers (IEEE) 802.11 (WIFI), and/or some other wireless protocol. Transceiver circuitry 111 is coupled to processing circuitry 112 over one or more data links. Processing circuitry 112 is coupled to other network elements over one or more data links. The data links uses IEEE 802.3 (Ethernet), Internet Protocol (IP), Intra-Processor Communications (IPC), bus data protocols, Time Division Multiplex (TDM), Data Over Cable System Interface Specification (DOCSIS), Wave Division Multiplexing (WDM), WIFI, SGNR, LTE and/or the like.

UEs 101-105 might be robots, vehicles, computers, sensors, phones, and the like. UEs 101-105 comprise radio circuitry and control circuitry. The radio circuitry comprises antennas, modulators, amplifiers, filters, digital/analog interfaces, processing circuitry, memory circuitry, and bus circuitry. The control circuitry comprises processing circuitry, memory circuitry, and bus circuitry. Software is stored in the memory circuitry and includes operating systems, network applications, and user applications. The network applications comprise Physical Layer (PHY), Media Access Control (MAC), Radio Link Control (RLC), Packet Data Convergence Protocol (PDCP), Radio Resource Control (RRC), and Service Data Application Protocol (SDAP), or some other networking protocol stack. The processing circuitry executes the operating systems, user applications, and network applications to exchange wireless signals that transport user data with radio circuitry 110.

Circuitry 111-112 comprises hardware like Digital Signal Processors (DSPs), Central Processing Units (CPUs), Graphical Processing Units (GPUs), Field Programmable Gate Arrays (FPGAs), Random Access Memory (RAM), flash memory, bus structures, network transceivers, and/or the like. Transceiver circuitry 111 further comprises antennas, modulators, amplifiers, filters, digital/analog interfaces, and the like. Software is stored in the memory circuitry and includes operating systems and network applications. The network applications comprise PHY, MAC, RLC, PDCP, RRC, and SDAP or some other networking protocol stack. Transceiver circuitry 111 executes the operating system and typically some network applications to exchange user data between UEs 101-105 and processing circuitry 112. Processing circuitry 112 executes the operating system and typically some network applications to exchange the user data between transceiver circuitry 111 and a data communication network (not shown).

In operation, transceiver circuitry 111 generates and transfers wireless signals to UEs 101-105 at a common transmit power level. The wireless signals have different QAM constellation sizes like QAM16, QAM32, QAM64, QAM128, QAM256, QAM512, and QAM1024. UEs 101-105 generate and transfer wireless signals to transceiver circuitry 111 that also have the different QAM constellation sizes. Transceiver circuitry 111 receives the wireless signals from UEs 101-105 having the different QAM constellation sizes. Transceiver circuitry 111 converts the received wireless signals into data symbols and converts the data symbols into uplink data. Processing system 112 transfers the uplink data from transceiver circuitry 111 to the data communication network.

Transceiver circuitry 111 determines symbol error for the data symbols like Error Vector Magnitude (EVM). EVM characterizes the difference between ideal symbols and received symbols. Transceiver circuitry 111 determines when the average symbol error for UEs that use a specific set of QAM constellation sizes exceeds an error threshold. For example, the specific set of QAM constellation sizes might be QAM256 or higher. UEs 101-105 report their received signal strength and/or received signal quality to transceiver circuitry 111. Based on the reported signal strength and/or quality, transceiver circuitry 111 determines a distribution ratio of UEs in the inner range of radio coverage to the UEs in the outer range of radio coverage. Transceiver circuitry 111 determines when the distribution ratio exceeds an inner concentration ratio—meaning that a high percentage (like 75%) of the UEs are located in the inner radio coverage. Transceiver circuitry 111 determines when both the average symbol error exceeds the error threshold and the distribution ratio exceeds the inner concentration threshold.

Processing system 112 transfers downlink data from the wireless data network to transceiver circuitry 111. When transceiver circuitry 111 determines that both the average symbol error exceeds the error threshold and the distribution ratio exceeds the inner concentration threshold, then transceiver circuitry 111 reduces transmit power to UEs 101-105. Transceiver circuitry 111 transmits wireless signals having the downlink data to UEs 101-105 at the reduced transmit power. When transceiver circuitry 111 determines that the average symbol error no longer exceeds the error threshold or that the distribution ratio no longer exceeds the inner concentration threshold, then transceiver circuitry 111 increases transmit power and transmits wireless signals having the downlink data to UEs 101-105 at the increased transmit power.

Advantageously, wireless communication network 100 efficiently and effectively controls transmit power to wireless UEs 101-105 based on UE locations and QAM constellation sizes.

Figure 2:
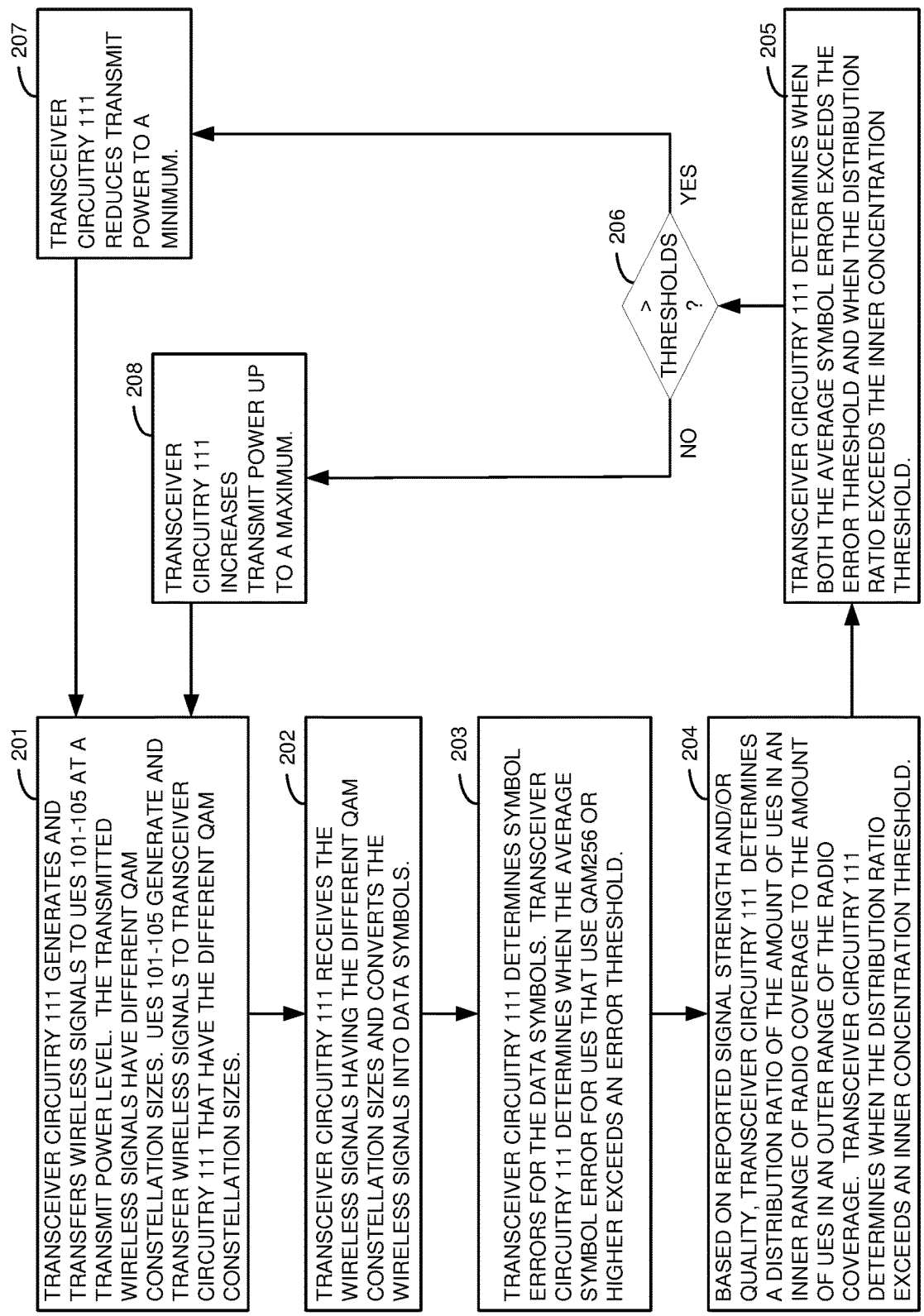
FIG. 2 illustrates the operation of the wireless communication network to control transmit power to the wireless UEs based on the UE QAM constellation sizes and the UE locations.

FIG. 2 illustrates the operation of wireless communication network 100 to control transmit power to wireless UEs 101-105 based on QAM constellation sizes and UE locations. Transceiver circuitry 111 generates and transfers wireless signals to UEs 101-105 at a transmit power level (201). The transmitted wireless signals have the different QAM constellation sizes. UEs 101-105 generate and transfer wireless signals to transceiver circuitry 111 that have the different QAM constellation sizes. Transceiver circuitry 111 receives the wireless signals having the different QAM constellation sizes and converts the wireless signals into data symbols (202).

Transceiver circuitry 111 determines symbol errors for the data symbols (203). Transceiver circuitry 111 determines when the average symbol error for UEs that use QAM256 or higher exceeds an error threshold. UEs 101-105 report their received signal strength and quality to transceiver circuitry 111. Based on the reported signal strength and/or quality, transceiver circuitry 111 determines a distribution ratio of the amount of UEs in the inner range of radio coverage to the amount of UEs in the outer range of the radio coverage (204). Transceiver circuitry 111 determines when the distribution ratio exceeds an inner concentration ratio—meaning that most of the UEs are located in the inner radio coverage—like 80%. Transceiver circuitry 111 determines when both the average symbol error exceeds the error threshold and when the distribution ratio exceeds the inner concentration threshold (205).

When transceiver circuitry 111 determines that both the average symbol error exceeds the error threshold and the distribution ratio exceeds the inner concentration threshold (206), then transceiver circuitry 111 reduces its transmit power to UEs 101-105 (207). The transmit power reduction may occur in steps until a minimum transmit power level is reached. The operation returns to block 201. When transceiver circuitry 111 determines that the average symbol error does not exceed the error threshold or that the distribution ratio does not exceed the inner concentration threshold (206), then transceiver circuitry 111 increases transmit power to UEs 101-105 (208). The transmit power increase may occur in steps until a maximum transmit power level is reached. The operation returns to block 201.

Figure 3:
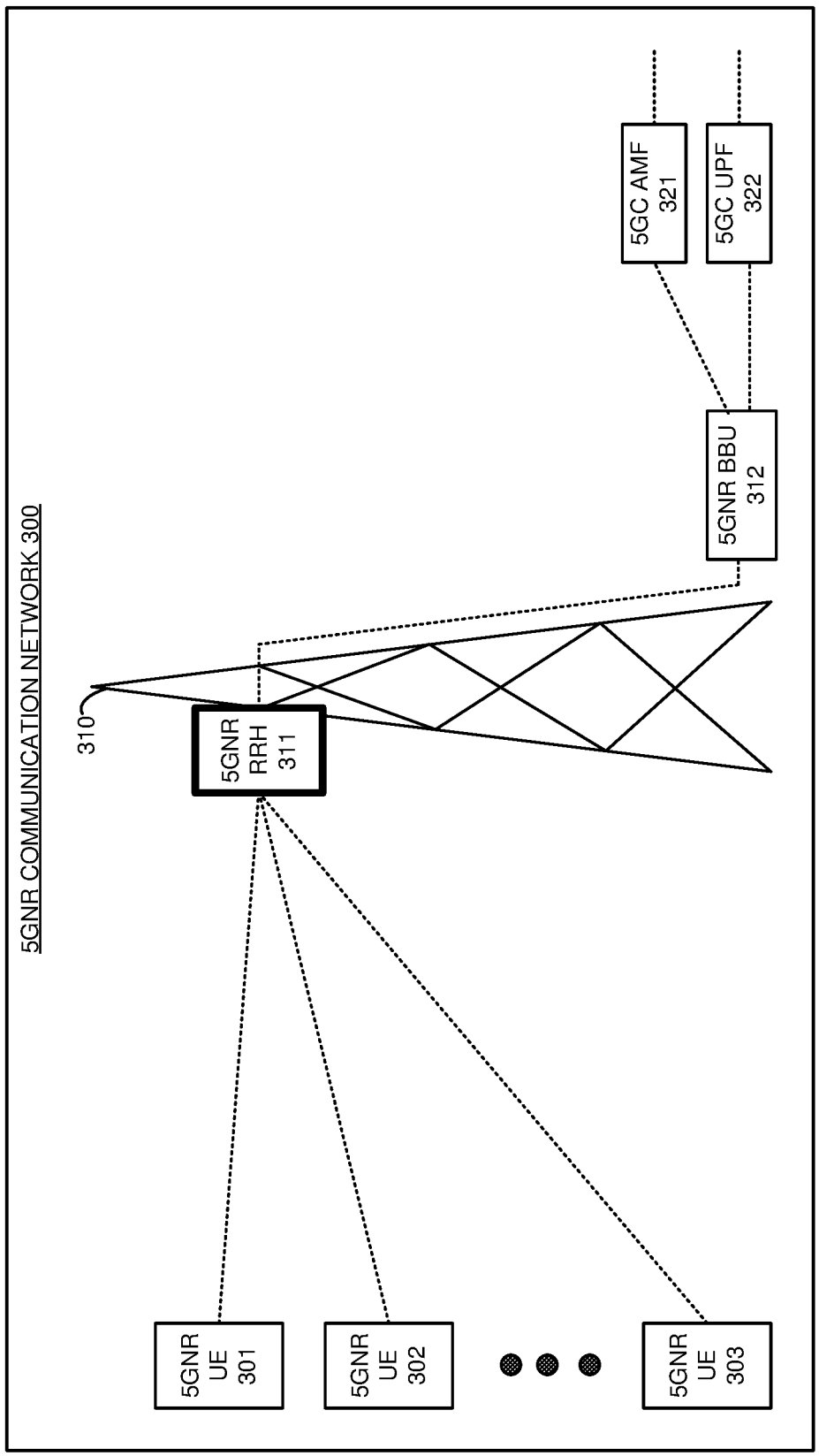
FIG. 3 illustrates a Fifth Generation New Radio (5GNR) communication network that controls transmit power to UEs based on UE QAM constellation sizes and UE locations.

FIG. 3 illustrates Fifth Generation New Radio (SGNR) communication network 300 that controls transmit power to UEs 301-303 based on UE locations and QAM constellation sizes. SGNR communication network 300 is an example of wireless communication network 100, although network 100 may differ. SGNR communication network 300 comprises UEs 301-303, wireless access point 310, Fifth Generation Core (5GC) Access and Mobility Management Function (AMF) 321, and 5GC User Plane Function (UPF) 322. Wireless access point 310 comprises SGNR Remote Radio Head (RRH) 311 and 5GNR Baseband Unit (BBU) 312. 5GNR UEs 301-303 and 5GNR RRH 311 are coupled by wireless data links. 5GNR RRH 311 and 5GNR BBU 312 are coupled by a wireless and/or wireline data link. 5GNR BBU 312 is coupled to 5GC AMF 321 and 5GC UPF 322 by wireless and/or wireline data links. 5GC AMF 321 and 5GC UPF 322 are coupled to other network elements (not shown).

UEs 301-303 might be robots, vehicles, computers, sensors, phones, and the like. As in FIG. 3, the number of UEs has been restricted for clarity, and 5GNR communication network includes many more UEs like UEs 301-303. UEs 301-303 use various QAM constellation sizes like 16, 64, 256, 512, and/or 1024. UEs 301-303 are located in an outer radio coverage area or an inner radio coverage area and may move between the coverage areas.

In operation, 5GC AMF 321 receives network signaling from a network element like a Session Management Function (SMF). 5GC AMF 321 transfers corresponding N1 and N2 signaling to 5GNR BBU 312. 5GC UPF 322 receives user data from a network element like a border controller. 5GC UPF 322 transfers corresponding N3 data to 5GNR BBU 312. 5GNR BBU 312 receives and processes the N2 signaling and N3 data. 5GNR BBU 312 transfers corresponding SDAP data and RRC signaling to 5GNR RRH 311. The RRC signaling transports the N1 signaling. 5GNR RRH 311 receives and processes the SDAP data and the RRC signaling to UEs 301-303 to generate and transfer wireless signals that carry the SDAP data and the RRC signaling and that have a transmit power level.

UEs 301-303 receive the wireless signals that carry the SDAP data and RRC signaling from 5GNR RRH 311. UEs 301-303 process the RRC signaling, N1 signaling, and SDAP data. UEs 301-303 also generate and transfer wireless signals that carry SDAP data and RRC signaling to 5GNR RRH 311. The RRC signaling transports N1 signaling. From different geographic locations, UEs 301-303 use different QAM constellation sizes to transmit the wireless signals to 5GNR RRH 311. 5GNR RRH 311 receives the wireless signals that carry the SDAP data and RRC signaling.

5GNR RRH 311 converts the received wireless signals into data symbols and converts the data symbols into uplink data and signaling. 5GNR RRH 311 determines average Error Vector Magnitude (EVM) for UEs that use QAM512 or higher—although other UE QAM groups could be used for EVM monitoring. UEs 301-303 report their received signal strength and received signal quality to 5GNR RRH 311. Based on the signal strength and/or quality, 5GNR RRH 311 determines a distribution ratio UEs in an inner range of 5GNR RRH 311 and UEs in an outer range of 5GNR RRH 311. A high signal strength and/or quality indicate a close UE and a low signal strength and/or quality indicates a distant UE. 5GNR RRH 311 determines when the distribution ratio exceeds an inner concentration ratio where a given percentage of UEs are located in the inner range. 5GNR RRH 311 determines when both the average EVM exceeds the error threshold and when the distribution ratio exceeds the inner concentration threshold.

When the average EVM and the distribution ratio both exceed their thresholds, then 5GNR RRH 311 reduces its power amplification of the wireless RRC/SDAP transmissions. The reduction may comprise step reductions to a minimum transmit power. When the average EVM and/or the distribution ratio no longer exceed their thresholds, then 5GNR RRH 311 increases its power amplification of the wireless RRC/SDAP transmissions. The increase may comprise step increases to a maximum transmit power.

5GNR RRH 311 transfers the received SDAP data and RRC signaling to 5GNR BBU 312. 5GNR BBU 312 processes the SDAP data and RRC signaling to generate corresponding N2 signaling and N3 data. 5GNR BBU 312 transfers the N1 signaling and N2 signaling to 5GC AMF 321. 5GNR BBU 312 transfers the N3 data to 5GC UPF 322. 5GC AMF 321 processes the N1 signaling and the N2 signaling and transfers network signaling to a network element like an SMF. 5GC UPF 322 processes the N3 data and transfers corresponding user data to a network element like a border controller.

Figure 4:
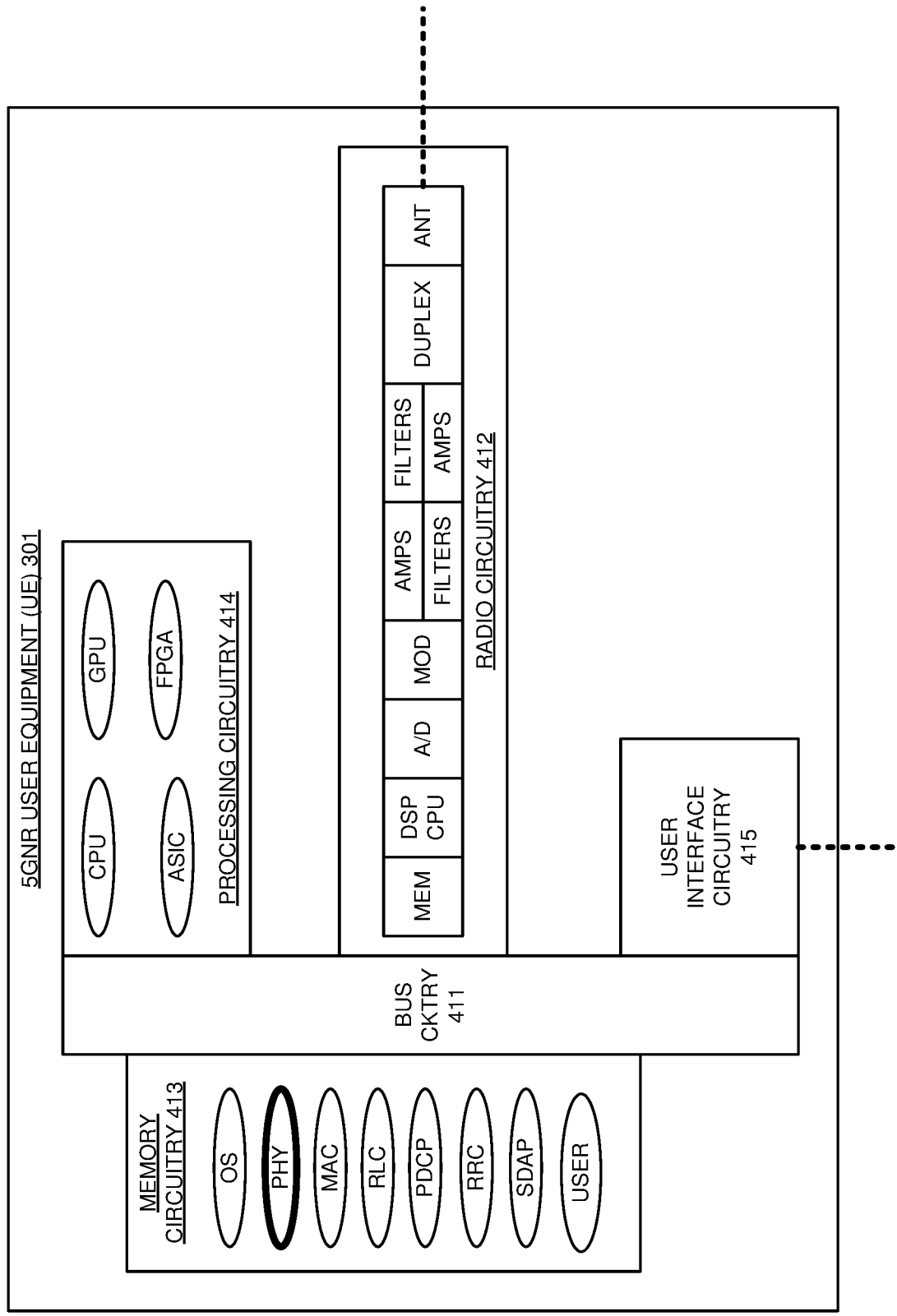
FIG. 4 illustrates a 5GNR UE that receives a signal which was power-controlled based on the UE QAM constellation sizes and the UE locations.

FIG. 4 illustrates 5GNR User Equipment (UE) 301 that receives a wireless signal that is power-controlled based on UE locations and QAM constellation sizes. 5GNR UE 301 is an example of UEs 101-105 and 302-303, although UEs 101-105 and 302-303 may differ. UE 301 comprises bus circuitry 411, radio circuitry 412, memory circuitry 413, processing circuitry 414, and user interface circuitry 415. Bus circuitry 411 couples radio circuitry 412, memory circuitry 413, processing circuitry 414, and user interface circuitry 415.

Memory circuitry 413 comprises volatile and non-volatile memories like RAM, flash, disc, tape, and the like. Memory circuitry 413 stores an operating system (OS), network applications, and user applications (User). The network applications comprise Physical Layer (PHY), Media Access Control (MAC), Radio Link Control (RLC), Packet Data Convergence Protocol (PDCP), Radio Resource Control (RRC), and Service Data Application Protocol (SDAP). Processing circuitry 414 comprises CPUs, GPUs, ASICs, FPGAs, and/or some other computer hardware. Processing circuitry 414 executes the operating system and user applications to generate user data and signaling. Processing circuitry 414 executes the operating system and the network applications to drive radio circuitry 412 to wirelessly exchange corresponding SDAP data and RRC signaling with wireless access point 310. User interface circuitry 415 may comprise transceivers, machine controllers, graphic displays, sensors, cameras, and/or some other user components.

Radio circuitry 412 comprises antennas (ANT), duplexers (DUPLEX), filters, amplifiers (AMPS), modulators (MOD), Analog/Digital interfaces (A/D), DSP, CPU, and memory (MEM). The antennas in radio circuitry 412 exchange wireless signals that carry SDAP data and RRC signaling with wireless access point 310. In radio circuitry 412, the DSP/CPUs execute firmware/software to drive the exchange of corresponding data signals between the antennas and memory circuitry 413.

The user applications generate user data and signaling. The user applications exchange user data with the SDAP. The user applications exchange user signaling with the RRC. The SDAP maps between user data and Service Data Units (SDUs). The RRC performs attachment and interacts with AMFs over N1 signaling to establish and terminate data sessions. The RRC handles authentication, security, handover operations, status reporting, QoS, system broadcasts, and network pages.

The RRC and the SDAP exchange the SDUs with the PDCP. The PDCP maps between the SDUs and Protocol Data Units (PDUs) for the RLC. PDCP functions comprise security ciphering, header compression and decompression, sequence numbering and re-sequencing, de-duplication. The PDCP exchange PDUs with the RLC. The RLC maps between the PDUs and MAC logical channels. RLC functions comprise ARQ, sequence numbering and resequencing, segmentation and resegmentation. The RLC exchanges the SDAP data and RRC signaling from the PDUs with the MAC over MAC logical channels. The MAC maps between the MAC logical channels and MAC transport channels. MAC functions include buffer status, power headroom, channel quality, Hybrid Automatic Repeat Request (HARQ), user identification, random access, user scheduling, and QoS. The MAC exchanges the SDAP data and RRC signaling with the PHY over the MAC transport channels.

The PHY maps between the MAC transport channels and PHY transport channels. The PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping. The PHY exchanges the SDAP data and RRC signaling with a PHY in wireless access point 310 over the PHY transport channels.

The RRC and SDAP store Uplink (UL) SDAP data and RRC signaling in the radio circuitry 412 memory. In radio circuitry 412, the DSP/CPUs transfer corresponding UL signals to the analog/digital interface. In the DSP/CPUs, the PHY uses a QAM having a given constellation size. The analog/digital interface converts the digital UL signals into analog UL signals for the modulators. The modulators up-convert the UL signals to their carrier frequencies. The amplifiers boost the UL signals for the filters which attenuate unwanted out-of-band energy. The filters transfer the UL signals through the duplexers to the antennas. The electrical UL signals drive the antennas to emit corresponding wireless UL signals that carry SDAP data and RRC signaling to wireless access point 310.

In radio circuitry 412, the antennas receive wireless Downlink (DL) signals that carry SDAP data and RRC signaling from wireless access point 310 and transfer corresponding electrical DL signals through the duplexers to the amplifiers. The DL signals were amplified by wireless access point 310 to a given transmit power level. In radio circuitry 412, the amplifiers boost the received DL signals for filters which attenuate unwanted energy. In modulation, demodulators down-convert the DL signals from their carrier frequencies. The analog/digital interfaces convert the analog DL signals into digital DL signals for the DSP/CPUs. The DSP/CPUs recover DL data that includes SDAP data and RRC signaling from the DL signals. In particular, the PHY uses the given QAM constellation size. The DSP/CPUs transfer the SDAP data and the RRC signaling to memory circuitry 413. The network applications process the DL SDAP data and RRC signaling including the N1 signaling and forward corresponding user data and signaling to the user applications. The user applications process the user data and signaling to drive user interface circuitry 415.

Figure 5:
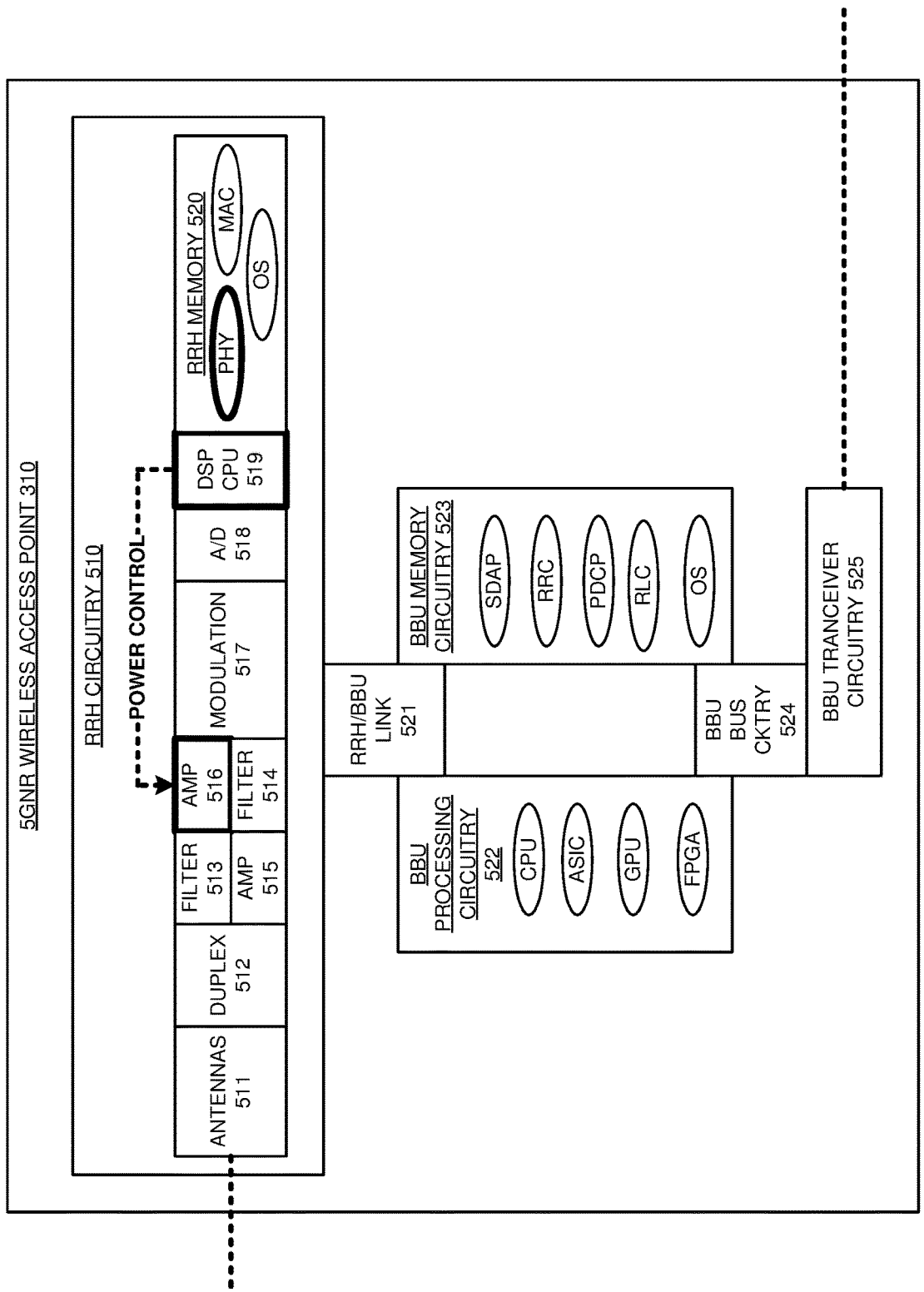
FIG. 5 illustrates a 5GNR wireless access point that controls transmit power to the UEs based on the UE QAM constellation sizes and the UE locations.

FIG. 5 illustrates 5GNR wireless access point 310 that controls transmit power to UEs 301-303 based on UE locations and QAM constellation sizes. Wireless access point 310 is an example of radio circuitry 110, although radio circuitry 110 may differ. Wireless access point 310 comprises Remote Radio Head (RRH) circuitry 510, RRH/Baseband Unit (BBU) link 521, BBU processing circuitry 522, BBU memory circuitry 523, BBU transceiver circuitry 524, and BBU bus circuitry 525. RRH/BBU link 521 couples RRH circuitry 510 to BBU processing circuitry 522 and BBU memory circuitry 523. BBU bus circuitry 524 couples BBU processing circuitry 522, BBU memory circuitry 523, and BBU transceiver circuitry 525. BBU transceiver circuitry 525 is coupled to 5GC AMF 321 and 5GC UPF 322.

BBU processing circuitry 522 comprises CPUs, GPUs, ASICs, FPGAs, and/or some other computer circuitry. BBU memory circuitry 523 comprises volatile and non-volatile memories like RAM, flash, disc, tape, and the like. BBU memory circuitry 523 stores an operating system and network applications. In this example, the network applications comprise RLC, PDCP, RRC, and SDAP—although BBU circuitry 522-523 may host all network applications, no network applications, or another group of network applications. BBU processing circuitry 522 executes the operating system and network applications to exchange SDAP data and RRC signaling in PDUs with RRH circuitry 510. BBU processing circuitry 522 executes the operating system and network applications to exchange corresponding N1 signaling and N2 signaling with AMF 321 and to exchange N3 data with UPF 322 over BBU circuitry 524-525.

RRH circuitry 510 comprises antennas 511, duplexers 512, filters 513-514, amplifiers 515-516, modulation 517, A/D interfaces 518, DSP/CPU 519, and RRH memory 520. RRH memory 520 comprises volatile and non-volatile memories like RAM, flash, and the like. RRH memory 520 stores an operating system and network applications. In this example, the RRH network applications comprise PHY and MAC—although RRH circuitry 510 may host all network applications, no network applications, or another group of network applications. In this exemplary split, the MAC in RRH circuitry 510 and the RLC in BBU circuitry 522-523 exchange SDAP data and RRC signaling over MAC logical channels that traverse RRH/BBU link 521. DSP/CPU 519 executes the operating systems and network applications to exchange the SDAP data and RRC signaling between BBU memory circuitry 523 and UEs 301-303 over RRH circuitry 510.

In BBU processing circuitry 522, the SDAP exchanges N3 data with UPF 322 and marks the N3 data for QoS. The SDAP maps between the N3 data and SDUs. The RRC exchanges N1 signaling between UEs 301-303 and AMF 321. The RRC generates and consumes N2 signaling exchanged with AMF 321. The RRC supports UE attachment and authentication. The RRC establishes and terminates data sessions. The RRC handles security, handover operations, status reporting, QoS, system broadcasts, and network pages. The RRC and the SDAP exchange their SDUs with the PDCP. The PDCP maps between the SDUs and PDUs for the RLC. PDCP functions comprise security ciphering, header compression and decompression, sequence numbering and re-sequencing, de-duplication. The PDCP exchange PDUs having the SDAP data and RRC signaling with the RLC. The RLC maps between the PDUs and MAC logical channels. RLC functions comprise ARQ, sequence numbering and resequencing, segmentation and resegmentation. The RLC exchanges the SDAP data and RRC signaling with the MAC over MAC logical channels that traverse RRH/BBU link 521.

In RRH DSP/CPU 519, the MAC maps between the MAC logical channels and MAC transport channels. MAC functions include buffer status, power headroom, channel quality, HARQ, user identification, random access, user scheduling, and QoS. The MAC exchanges the SDAP data and RRC signaling with the PHY over the MAC transport channels. The PHY maps between the MAC transport channels and PHY transport channels. The PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping. The PHY exchanges the SDAP data and RRC signaling with PHYs in UEs 301-303 over the PHY transport channels.

In RRH circuitry 510, antennas 511 receive wireless UL signals from UEs 301-303 and transfer corresponding electrical UL signals through duplexer 512 to low-noise amplifier 515. The low-noise amplifier boosts the weaker UL signals for filters 514 which attenuate unwanted energy. In modulation 517, demodulators down-convert the UL signals from their carrier frequencies. A/D interfaces 518 convert the analog UL signals into digital UL signals for DSP/CPU 519.

In DSP/CPU 519, the PHY uses QAMs having various constellation sizes to process the UL signals. The PHY determines average UL EVM for UEs 301-303 for QAM 512 and higher (although other QAM groups could be used for EVM monitoring). The PHY allocates UEs 301-303 to inner and outer coverage zones based on reported received signal strength. The PHY determines when both average UL EVM exceeds an error threshold and UEs 301-303 are concentrated in the inner coverage zone. When the PHY determines that the average UL EVM exceeds its threshold and that UEs 301-303 are concentrated in the inner coverage zone, then the PHY drives DSP/CPU 519 to decrease the transmit power of power amplifier 516. The transmit power reduction occurs in steps down to a minimum transmit power. When the PHY determines that the average UL EVM does not exceed the threshold or that the UEs are not concentrated in the inner coverage zone, the PHY drives DSP/CPU 519 to increase the transmit power of power amplifier 516. The transmit power increase may occur in steps up to a maximum transmit power.

DSP/CPU 519 executes the network applications to recover and store UL SDAP data and RRC signaling in BBU memory circuitry 523. In BBU processing circuitry 522, the BBU network applications process the recovered UL SDAP data and RRC signaling from BBU memory circuitry 523. The BBU RRC generates N2 signaling. The BBU network applications forward the UL N1 signaling, N2 signaling, and N3 data from memory circuitry 523 to AMF 321 and UPF 322 over BBU circuitry 524-525.

BBU transceiver circuitry 525 receives Downlink (DL) N1 signaling, N2 signaling, and N3 data from AMF 321 and UPF 322. BBU transceiver circuitry 525 stores the DL data and signaling in BBU memory circuitry 523. The BBU network applications process the N3 data and N2 signaling from memory circuitry 523 to generate SDAP data and RRC signaling that includes the N1 signaling. The BBU network applications forward the SDAP data and RRC signaling to the RRH network applications in RRH circuitry 510 over MAC logical channels in link 521.

In RRH circuitry 510, the network applications drive DSP/CPU 519 to transfer corresponding DL signals to A/D interface 518. A/D interface 518 converts the digital DL signals into analog DL signals for modulation 517. Modulation 517 up-converts the DL signals to their carrier frequencies. Power amplifier 516 amplifies the DL signals to the transmit power level designated by the PHY in DSP/CPU 519. Power amplifier 516 transfers the amplified DL signals to filter 513 which attenuates unwanted out-of-band energy. Filter 513 transfers the DL signals through duplexer 512 to antennas 511. The electrical DL signals drive antennas 511 to emit corresponding wireless DL signals to UEs 301-303 at the designated transmit power level.

Figure 6:
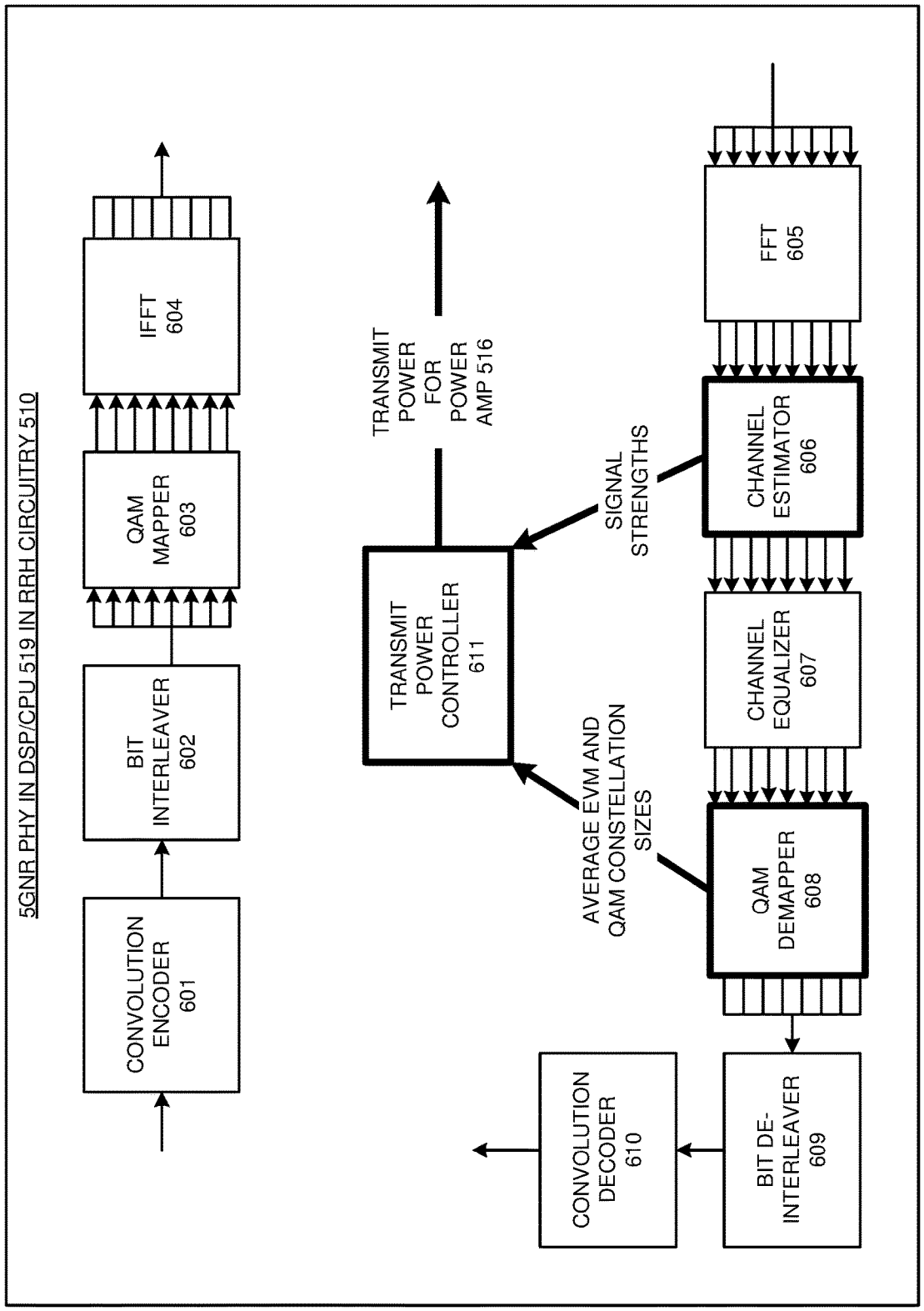
FIG. 6 illustrates a 5GNR PHY that controls transmit power to the UEs based on the UE QAM constellation sizes and the UE locations.

FIG. 6 illustrates the 5GNR PHY in DSP/CPU 519 in RRH circuitry 510 that controls transmit power to UEs based on UE locations and QAM constellation sizes. The 5GNR PHY is an example of radio circuitry 110, although radio circuitry 110 may differ. The 5GNR PHY comprises convolution encoder 601, bit interleaver 602, QAM mapper 603, symbol generator 604, Inverse Fast Fourier Transforms (IFFT) 605, FFT 606, channel estimator 607, channel equalizer 608, symbol detector 609, QAM demapper 610, bit de-interleaver 611, and convolution decoder 612.

On the DL, convolution encoder 601 receives a bit stream of SDAP data, RRC signaling, and other network information from another PHY component. Convolution encoder 601 adds error-correction bits by applying a polynomial function in a sliding manner to the data stream. Bit interleaver 602 rearranges the data to distribute errors and mitigate error bursts. The bit stream is converted from serial-to-parallel for QAM mapper 603. QAM mapper 603 maps parallel time-domain bit streams into parallel frequency-domain symbols using various constellation sizes. IFFT 604 converts the parallel frequency-domain symbols into parallel streams of time-domain data. The streams of time-domain data are converted from parallel to serial for digital-to-analog conversion and power amplification. Transmit power controller 611 controls the power amplification level.

On the UL, a stream of time-domain data from analog-to-digital conversion is converted from serial to parallel to for FFT 605. FFT 605 transforms the parallel time-domain signals into parallel frequency-domain signals. Channel estimator 606 processes the parallel frequency-domain signals to determine radio measurements like signal strength and quality. Channel equalizer 607 attenuates and amplifies parallel frequency-domain signals to pass energy from desired frequencies and to suppress energy from unwanted frequencies. QAM demapper 608 detects frequency-domain symbols from the equalized signals. QAM demapper 608 determines average Error Vector Magnitude (EVM) for the symbols. QAM demapper 608 uses QAMs of different constellation sizes to demap the frequency-domain symbols into parallel time-domain data. The parallel time-domain data is converted from parallel-to-serial for bit de-interleaver 609. Bit de-interleaver 609 rearranges the data back to its original order to mitigate burst errors. Convolution decoder 610 checks error-correction bits with the sliding polynomial function and transfers UL SDAP data and RRC signaling to other PHY components for subsequent processing.

In the 5GNR PHY, transmit power controller 611 receives the QAM constellation sizes and signal strengths for the UEs and also receives average UL EVM for the various QAM constellation sizes. Transmit power controller 611 allocates the UEs to coverage zones based on their signal strengths. Transmit power controller 611 determines when both average UL EVM exceeds an error threshold and the UEs for given QAM constellation sizes are concentrated in an inner coverage zone. When transmit power controller 611 determines that the average UL EVM exceeds its threshold and the UEs are concentrated in the inner coverage zone, then transmit power controller 611 decreases the transmit power of power amplifier 516 in steps down to a minimum transmit power. When transmit power controller 611 determines that the average UL EVM does not exceed the threshold or that the UEs are not concentrated in the inner coverage zone, then transmit power controller 611 increases the transmit power of power amplifier 516 in steps up to a maximum transmit power.

The wireless data network circuitry described above comprises computer hardware and software that form special-purpose network circuitry that controls transmit power based on UE QAM constellation size and UE location. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry that controls transmit power based on UE QAM constellation size and UE location.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating radio circuitry to control wireless transmit power to User Equipment (UEs), the method comprising:

transceiver circuitry receiving wireless signals that were generated by the UEs using different Quadrature Amplitude Modulation (QAM) constellation sizes, converting the wireless signals into data symbols, and converting the data symbols into uplink data;

the transceiver circuitry determining symbol error and when average symbol error exceeds an error threshold for ones of the UEs that use a set of the QAM constellation sizes;

the transceiver circuitry determining a distribution ratio and when the distribution ratio exceeds an inner concentration threshold, wherein the distribution ratio compares an inner amount of the UEs located in an inner range of radio coverage to an outer amount of the UEs located in an outer range of the radio coverage;

the transceiver circuitry determining when both the average symbol error exceeds the error threshold and when the distribution ratio exceeds the inner concentration threshold, and in response, the transceiver circuitry transmitting wireless signals having downlink data at a reduced transmit power to the UEs; and processing circuitry receiving the downlink data from a wireless communication network, transferring the downlink data to the transceiver circuitry, receiving the uplink data from the transceiver circuitry, and transferring the uplink data to the wireless communication network.

2. The method of claim 1 further comprising the transceiver circuitry determining when the average symbol error no longer exceeds the error threshold or when the distribution ratio no longer exceeds the inner concentration threshold, and in response, the transceiver circuitry transmitting subsequent wireless signals having subsequent downlink data at an increased transmit power to the UEs.

3. The method of claim 1 wherein the set of the QAM constellation sizes comprises QAM256 and higher.

4. The method of claim 1 wherein the set of the QAM constellation sizes comprises QAM512 and higher.

5. The method of claim 1 wherein the set of the QAM constellation sizes comprises QAM1024 and higher.

6. The method of claim 1 wherein the average symbol error comprises average Error Vector Magnitude (EVM).

7. The method of claim 1 wherein the processing circuitry comprises a Fifth Generation New Radio (5GNR) radio.

8. The method of claim 1 wherein the processing circuitry comprises a Fifth Generation New Radio (5GNR) Physical Layer (PHY).

9. The method of claim 1 wherein the processing circuitry determines the inner amount of the UEs and the outer amount of the UEs based on received signal strengths reported by the UEs.

10. The method of claim 1 wherein the processing circuitry determines the inner amount of the UEs and the outer amount of the UEs based on received signal qualities reported by the UEs.

11. Radio circuitry to control wireless transmit power to User Equipment (UEs), the radio circuitry comprising:

transceiver circuitry receiving wireless signals that were generated by the UEs using different Quadrature Amplitude Modulation (QAM) constellation sizes, converting the wireless signals into data symbols, and converting the data symbols into uplink data;

the transceiver circuitry configured to determine symbol error and when average symbol error exceeds an error threshold for ones of the UEs that use a set of the QAM constellation sizes;

the transceiver circuitry configured to determine a distribution ratio and when the distribution ratio exceeds an inner concentration threshold, wherein the distribution ratio compares an inner amount of the UEs located in an inner range of radio coverage to an outer amount of the UEs located in an outer range of the radio coverage;

the transceiver circuitry configured to determine when both the average symbol error exceeds the error threshold and when the distribution ratio exceeds the inner concentration threshold, and in response, the transceiver circuitry configured to transmit wireless signals having downlink data at a reduced transmit power to the UEs; and processing circuitry configured to receive the downlink data from a wireless communication network, transfer the downlink data to the transceiver circuitry, receive the uplink data from the transceiver circuitry, and transfer the uplink data to the wireless communication network.

12. The radio circuitry of claim 11 further comprising the transceiver circuitry configured to determine when the average symbol error no longer exceeds the error threshold or when the distribution ratio no longer exceeds the inner concentration threshold, and in response, the transceiver circuitry configured to transmit subsequent wireless signals having subsequent downlink data at an increased transmit power to the UEs.

13. The radio circuitry of claim 11 wherein the set of the QAM constellation sizes comprises QAM256 and higher.

14. The radio circuitry of claim 11 wherein the set of the QAM constellation sizes comprises QAM512 and higher.

15. The radio circuitry of claim 11 wherein the set of the QAM constellation sizes comprises QAM1024 and higher.

16. The radio circuitry of claim 11 wherein the average symbol error comprises average Error Vector Magnitude (EVM).

17. The radio circuitry of claim 11 wherein the processing circuitry comprises a Fifth Generation New Radio (5GNR) radio.

18. The radio circuitry of claim 11 wherein the processing circuitry comprises a Fifth Generation New Radio (5GNR) Physical Layer (PHY).

19. The radio circuitry of claim 11 wherein the processing circuitry is configured to determine the inner amount of the UEs and the outer amount of the UEs based on received signal strengths reported by the UEs.

20. The radio circuitry of claim 11 wherein the processing circuitry is configured to determine the inner amount of the UEs and the outer amount of the UEs based on received signal qualities reported by the UEs.

* * * * *